United States Patent Office 3,840,561
Patented Oct. 8, 1974

3,840,561
3-AMINOMETHYL-1-PHENYLISOCHROMANS
AND THEIR PREPARATION
Francis J. Petracek, Bloomington, and Nobuyuki Sugisaska, New Brighton, Minn., assignors to Riker Laboratories, Inc., Northridge, Calif.
No Drawing. Filed Aug. 25, 1971, Ser. No. 174,993
Int. Cl. C07d 7/18
U.S. Cl. 260—345.2                                    12 Claims

ABSTRACT OF THE DISCLOSURE

A process for the preparation of 3-aminomethyl-1-phenylisochroman compounds comprising the conversion of a 1-phenyl-3-isochromancarboxylic acid to its corresponding acid halide, treatment of the acid halide to form the corresponding amide and then reducing the carbonyl group of the amide to yield the 3-aminomethyl-1-phenylisochroman final product; and intermediates.

This invention relates to processes for the preparation of substituted isochromans; and intermediates therefor.

BACKGROUND OF THE INVENTION 1-phenylisochroman is known, as are derivatives of isochroman, for example as shown in U.S. Pat. 2,701,254 which describes derivatives of isochroman in which cyano, carbamido or carboxy substituents are present on the benzene ring thereof. Flavones and flavanoid compounds are known, in which a chroman or chromone ring structure is present, flavone as such being 2-phenylchromone. U.S. Pat. 3,410,851 and U.S. Pat. 3,450,717 disclose numerous derivatives of flavone. Derivatives of chroman are also shown in U.S. Pat. 3,103,515. See also Colonge et al., Compt. rend. 239, 1047–49 (1954) and Rieche et al., Ber. 89, 1254–62 (1956). However, the compounds of the prior art are believed to be significantly different from those of the present invention, and so far as is known to applicants, 1-phenylisochromanone or 1-phenalkylisochromanone and derivatives of 1-phenylisochroman and 1-phenalkylisochroman of the type disclosed herein have not been heretofore described. Processes for producing aminomethyl-substituted phenylisochromans similar to the process described and claimed herein have likewise not been disclosed, so far as applicants are aware.

Broadly speaking, the process of the invention comprises reaction of a 1-phenyl-3-isochromancarboxylic acid halide with ammonia, a primary or secondary lower alkylamine, or a saturated heterocyclic base, and reducing the resulting amide, preferably with a hydride-type reducing agent, to form a 1-phenylisochroman final product wherein the 3 position bears an aminomethyl, N-lower alkylaminomethyl, N,N-di-lower alkylaminomethyl or saturated heterocyclic-substituted methyl substituent, all of such nitrogen-containing substituents being referred to generically herein as "aminomethyl" substituents.

Compounds produced by the process of the invention can be represented by the formula

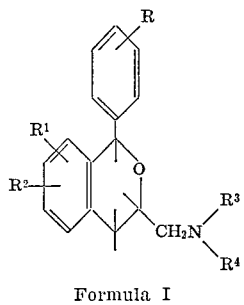

Formula I wherein R is hydrogen, lower alkyl, halogen, trifluoromethyl, amino, N-lower alkylamino or N,N'-lower dialkylamino; $R^1$ and $R^2$ are independently hydrogen, lower alkyl, trifluoromethyl, hydroxy and lower alkoxy, and $R^3$ and $R^4$ are independently hydrogen, lower alkyl or hydroxy-lower alkyl, and, when taken together with the nitrogen atom to which they are attached, form a saturated 5 or 6 membered nitrogen-containing ring having from 3 to 5 carbon atoms in the ring, one of which may be replaced by oxygen.

As used throughout the application, the terms "lower alkyl" and "lower alkoxy" embrace both straight and branched chain alkyl and alkoxy radicals, respectively, containing from 1 to 6 carbon atoms, including, for example, in the alkyl group thereof, but without limitation, methyl, ethyl, n-propyl, isopropyl, n-butyl, tert-butyl, n-amyl, sec-amyl, n-hexyl, 2-ethylbutyl, 2,3-dimethylbutyl and the like; the term "saturated heterocyclic base" embraces pyrrolidino, piperidino, morpholino, piperazino, N-lower alkylpiperazine, N-phenylpiperazino and the like, and the term "halogen" includes chlorine, bromine and fluorine.

The final products obtained in the practice of the process of this invention are novel compounds having valuable pharmacological activity on the central nervous system.

The manner and process of carrying out and using the invention will now be generally described so as to enable one skilled in the art of chemistry to make and use the same as follows.

The preparation of 3 - aminomethyl - 1 - phenylisochromans according to the present invention is illustrated by the following reaction sequence in which R, $R^1$, $R^2$, $R^3$ and $R^4$ have the significance set forth hereinabove and X is chlorine or bromine.

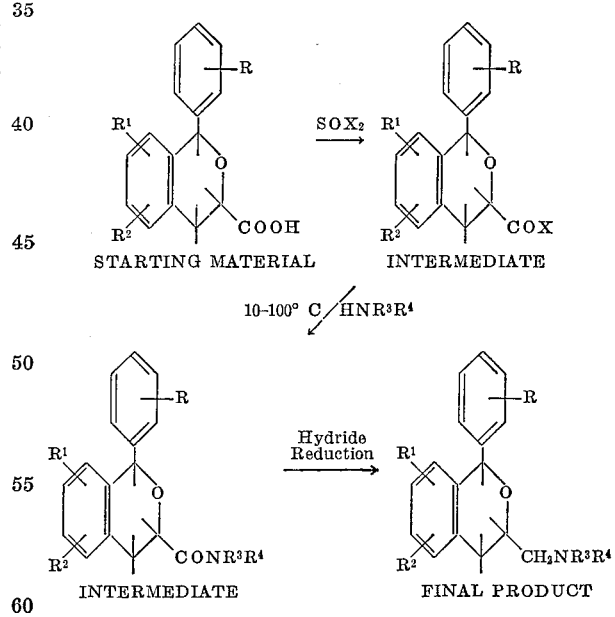

The 1-phenyl-3-isochromancarboxylic acid starting materials in the above reaction sequence are conveniently prepared by the reaction of a phenyllactic or substituted phenyllactic acid with benzaldehyde or substituted benzaldehyde as hereinafter described in the presence of gaseous hydrogen chloride and a Lewis acid catalyst such as, for example, zinc chloride.

In carrying out the process according to the present invention, the 1-phenyl-3-isochromancarboxylic acid starting material is converted to the acid halide, e.g. with thionyl chloride at a temperature between about 0° and 100° C. and in the presence of an inert organic solvent (i.e., as used in this specification, a solvent inert toward the other components of the reaction mixture) such as, for example, methylene chloride, benzene, and the like. If desired, other acid halide-forming agents may be used in place of the specific thionyl chloride shown in the above-depicted reaction sequence, such as, for example, thionyl bromide, phosphorus pentachloride, phosphorus pentabromide, phosphorus oxychloride and the like. Such other acid halide-forming agents are the full equivalents of the specific thionyl chloride shown, and their use is included within the scope of the present invention.

The acid halide thus formed is then treated with ammonia, a primary or secondary lower alkylamine, or saturated heterocyclic base in the presence of an inert organic solvent, such as, for example, methanol, chloroform and the like, and at e.g. the reflux temperature of the solvent used, to form the corresponding 1-phenyl-3-isochromancarboxamide intermediate.

Among the primary and secondary amines, and saturated heterocyclic bases, that may be used in carrying out the reaction sequence comprising the invention are: alkylamines, as for example ethylamine, isoamylamine, propylamine; butylamines, e.g. n, sec, etc.; di-lower alkylamines such as diethylamine, di-n-hexylamine and di-isopropylamine; and cyclic lower alkylamines such as cyclopropylamine, cyclopentylamine, cyclohexylamine, N-methylcyclobutylamine, N-methylcyclohexylamine, N-ethylcyclopentylamine and the like.

The heterocyclic bases used in the process according to this invention may, if desired, bear one or more alkyl substituents. Illustrative of heterocyclic and lower alkylsubstituted heterocyclic bases that can be used in the practice of this invention are: pyrrolidine, piperidine, piperazine, morpholine and the like; methylpyrrolidine, 2-ethylpyrrolidine, 1-n-butylpyrrolidine, 2,5-dimethylpyrrolidine, 2,5-diethylpyrrolidine, 2-ethyl-4-methylpyrrolidine, 1-methyl-2-propylpyrrolidine, 1,2,4-trimethylpyrrolidine, 4-methylpiperidine, 1-ethylpiperidine, 2-n-propylpiperidine, 1,4-diethylpiperidine, 2,2-dimethylpiperidine, 1-methylpiperazine, 2-ethylpiperazine, 1,4-dimethylpiperazine, 2,5-dimethylpiperazine, 1,4-diethylpiperazine, 2-ethyl-5-methylpiperazine, 1,2,4-trimethylpiperazine, 2,3,5-trimethylpiperazine, 4-methylmorpholine, 2-isopropylmorpholine, 2,3-dimethylmorpholine, 3,5-dimethylmorpholine, and the like.

The use of any one of these primary or secondary amines, or saturated heterocyclic bases, is fully equivalent to the use of the specific amines used in the examples and is included within the scope of the present invention.

The 1-phenyl-3-isochromancarboxamide thus formed is converted to the corresponding 3-aminomethyl-1-phenylisochroman final product by reduction, e.g. with lithium aluminum hydride, in the presence of an inert organic solvent such as, for example, tetrahydrofuran. Other amide reducing agents such as, for example, diborane, can also be used in carrying out the process according to the present invention. Such amide reducing agents are the full equivalents of the specific lithium aluminum reducing agent described in the above-depicted reaction sequence, and their use is included within the scope of the process of the present invention.

The reaction is carried out at a reflux temperature of the solvent used and the product is recovered by conventional techniques of isolation and purification.

In carrying out the process according to the present invention, as shown in the above-described reaction sequence, 1-phenyl-3-isochromancarboxylic acid starting materials may also be employed wherein the benzenoid portion of the isochroman nucleus and/or the phenyl substituent may be optionally substituted by one or more lower alkyl, lower alkoxy, halo or trifluoromethyl substituents. Such optionally substituted starting materials are prepared by the same procedure as described above, using the correspondingly substituted phenyllactic and corresponding substituted benzaldehyde, and their use is fully equivalent to the use of the specific 1-phenyl-3-isochromancarboxylic acid starting material depicted in the above reaction sequence and the use is included within the scope of this invention. The use of such starting materials also results in the preparation of 1-phenyl-3-isochromomancarboxamides bearing corresponding substitution, and such substituted 1-phenyl-3-isochromancarboxamides are the full equivalents of their unsubstituted counterparts, have the same use in the practice of this invention, and are included within its scope.

The carboxylic acid form of the intermediate compounds of the invention can be represented by the formula

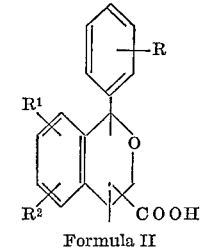

Formula II wherein R is hydrogen, lower alkyl, lower alkoxy, halogen, hydroxy, amino, N-lower alkylamino or N,N-di-lower alkylamino; and $R^1$ and $R^2$ are each hydrogen, lower alkyl, trifluoromethyl, hydroxy, lower alkoxy or halogen.

The carbonyl-linked and other simple carboxylic acid derivatives of the invention are compounds selected from the group consisting of salts, esters, acid halides, acid anhydrides, acid amides, imino esters, amidines, hydroxamic acids, acid hydrazides and acid azides. These substances are readily prepared carboxylic acid derivatives made by methods well known to the art.

The claimed carboxylic acid amides, amidines, anhydries and acid chlorides are directly useful for the preparation of 3-amino-substituted 1-phenyl- and 1-phenyl-lower alkylisochromans.

The following reaction sequence, in which R, $R^1$ and $R^2$ have the significance set forth hereinabove, is illustrative of the process for preparing 1-phenyl-3-isochromancarboxylic acids according to the present invention.

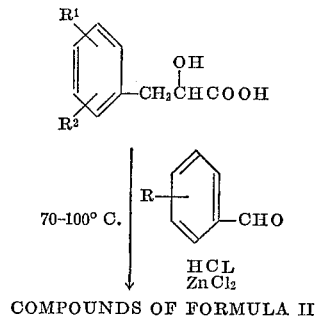

COMPOUNDS OF FORMULA II

The 3-phenyllactic acids are readily available in commerce or can be prepared as described by K. Harada, J. Org. Chem. 31:1487 (1966), by the catalytic hydrogentation of potassium of β-phenylglycidate. Illustrative of such 3-phenyllactic acid useful as starting materials in the above reaction sequence are: 3-phenyllactic acid, 3-(o-, m- or p-hydroxyphenyl)lactic acid, 3-(4-hydroxy-3-methoxyphenyl)lactic acid, 3-(o-, m- or p-methoxyphenyl)lactic acid, 3-(3,4-dihydroxyphenyl)lactic acid, 3-(3,4-dimethoxyphenyl)lactic acid, 3-(o-, m- or p-chlorophenyl)lactic acid, and 3-(p-aminophenyl)lactic acid.

According to the reaction sequence depicted above, the selected phenyllactic acid is treated with a selected benzaldehyde in the presence of gaseous hydrogen chloride and a Lewis acid catalyst such as, for example, zinc chloride, to form the correspondingly unsubstituted 1-phenyl-3-isochromancarboxylic acid final product. No solvent is required for the reaction but, if desired, an inert organic solvent (e.g. a solvent which is inert to the other components of the reaction mixture) such as methanol may be used. The reaction is conveniently carried out at a temperature in the range of from 70° to 100° C. The reaction product is recovered by conventional techniques of isolation and purification.

Illustrative of aldehydes that can be used in the process are: o-, m- or p-tolualdehyde, o-, m- or p-ethylbenzaldehyde, o-isopropylbenzaldehyde, p-pentylbenzaldehyde, o-, m- or p-anisaldehyde, o-, m- or p-ethoxybenzaldehyde, p-ethoxybenzaldehyde, o-butoxybenzaldehyde, p-(hexyloxy)benzaldehyde, o-, m- or p-hydroxybenzaldehyde, o-, m- or p-chlorobenzaldehyde, p-bromobenzaldehyde, p-iodobenzaldehyde, o-, m- or p-fluorobenzaldehyde, o-, m- or p-aminobenzaldehyde, p-methylaminobenzaldehyde, m- or p-dimethyl- or diethyl-aminobenzaldehyde, and the like.

The use of any of these known benzaldehydes is fully equivalent to the use of the specific benzaldehyde used in the examples herein and is included within the scope of the present invention.

The carbonyl-linked and other simple carboxylic acid derivatives of the invention are prepared by standard procedures that are found in organic chemistry texts. Among such derivatives and representative methods for preparing them are:

(a) Metal salts: These acids from salts with bases such as sodium hydroxide, potassium hydroxide and the like. Thus treatment with stoichiometric amounts of sodium hydroxide, preferably in aqueous medium, forms sodium 1-phenyl-3-isochromancarboxylate.

(b) Esters: These are readily obtainable by any of a number of known methods for esterifying carboxylic acids. For example, treatment of the 1-phenyl-3-isochromancarboxylic acid with excess ethanol in the presence of a small amount of sulfuric acid as catalyst will give the corresponding ethyl 1-phenyl-3-isochromancarboxylate.

(c) Acid halides: These are obtained by treating the acid with reagents such as thionyl chloride, thionyl bromide, phosphorus trichloride, phosphorus pentabromide and the like.

(d) Acid anhydrides: These are readily prepared by treatment of the anhydrous acid with a suitable dehydrating agent such as acetic anhydride, acetyl chloride, phosphorus pentoxide and the like.

(e) Acid amides: These are conveniently prepared from the acid halides by treatment with an appropriate primary or secondary amine, ammonia or a heteromonocyclic base.

(f) Imino esters: These are prepared from amides by dehydration to the corresponding nitriles, and treatment of an equimolar mixture of a nitrile and an alcohol with dry hydrogen chloride gas.

(g) Amidines: These are prepared from the imino esters by reaction with alcoholic ammonia, primary or secondary amines.

(h) Hydroxamic acids: These are usually formed by the action of hydroxylamine on the esters of the 1-phenyl-3-isochromancarboxylic acids. They may also be formed by the action of hydroxylamine on the acid amides, acid anhydrides or acid halides.

(i) Acid hydrazides: These are formed by the action of hydrazine on the esters of 1-phenyl-3-isochromancarboxylic acids, the acid halides or acid anhydrides.

(j) Acid azides: These are prepared by treating an acetone, diethyl ether or dioxane solution of the corresponding acid halide with an aqueous solution of sodium azide.

All of these intermediates are useful, e.g. to characterize the carboxylic acids, or as reactive intermediates for preparing carboxylic acids.

The best mode contemplated by the inventors for carrying out the process of the invention will now be set forth as follows:

EXAMPLE 1

(1) 1-(p-trifluoromethylphenyl)-3-isochromancarboxylic acid

A mixture of β-phenyllactic acid (13.3 g., 0.08 mole), p-trifluoromethylbenzaldehyde (27.8 g., 0.16 mole) and freshly prepared zinc chloride (3 g.) is treated with hydrogen chloride gas for five hours. The thick mixture slowly forms a solution (no external cooling needed). The solution is stirred at room temperature overnight, whereupon the product solidifies. The product is taken up in about 200 ml. of ether, and the ether solution is extracted with dilute aqueous sodium hydroxide. After separation, a solid separates from the alkaline solution and requires the addition of water in amount sufficient to redissolve. The basic solution is washed with several portions of ether, and then is made acidic with dilute hydrochloric acid and extracted with several portions of chloroform. The combined chloroform extracts are dried and concentrated *in vacuo* to a white solid; yield, 22.1 g., m.p. 204–205° C. The product is recrystallized from benzene-petroleum ether for purification.

Analysis: Calculated for $C_{17}H_{13}F_3O_3$: C, 63.36; H, 4.07. Found: C, 63.45; H, 4.17.

(2) 1-(p-trifluoromethylphenyl)-3-isochromancarboxamide

A mixture of 1-(p-trifluoromethylphenyl)-3-isochromancarboxylic acid (13 g., 0.04 mole), thionyl chloride (20 ml.) and benzene (50 ml.) is warmed on the steam bath (foaming) for 15 minutes until a clear solution is formed. After cooling, the solution is concentrated *in vacuo* to a solid residue. The solid is pulverized and added to a vigorously stirred solution of excess concentrated ammonium hydroxide. After stirring vigorously at room temperature overnight, the mixture is filtered, washed well with water and dried (55° C.) *in vacuo* to yield 12.2 g. of the amide. A sample of the product recrystallized from isopropanol had m.p. 234–235.5° C.

Analysis: Calculated for $C_{17}H_{14}F_3NO_2$: C, 63.55; H, 4.39; N, 4.36. Found: C, 63.76; H, 3.93; N, 4.30.

(3) 3-aminomethyl-1-(p-trifluoromethylphenyl)isochromanhydrochloride

To a cold stirred solution of 1-(p-trifluoromethylphenyl)-3-isochromancarboxamide (7 g., 0.022 mole) in tetrahydrofuran (300 ml.) is added dropwise a solution of diborane (55 ml., 1M in tetrahyrdrofuran). The solution is refluxed 10 hours, cooled and decomposed with hydrochloric acid (140 ml.). The tetrahydrofuran is removed *in vacuo* and the acidic slurry is made basic with dilute sodium hydroxide solution and extracted with several portions of ether. The combined ether extracts are dried *in vacuo* to a gum. The gum is taken up in anhydrous ether (100 ml.), filtered and treated with concentrated hydrochloric acid until acid to Congo Red. The ether solution is then concentrated to a small volume and crystallized on the addition of petroleum ether; yield 4.4 g., m.p. 175–177° C.

Analysis: Calculated for $C_{17}H_{17}F_3NOCl$: C, 59.40; H, 4.98; N, 4.07; Cl, 10.31. Found: C, 59.27; H, 5.01; N, 3.96; Cl, 10.24.

EXAMPLE 2

(1) *Cis/trans*-1-phenylisochroman-3-carboxylic acid

A mixture of two moles of benzaldehyde, 1 mole of dl-phenyllactic acid and 0.3 mole of zinc chloride is heated and stirred at 50° C. while treating with gaseous hydrogen chloride for five hours. The product is extracted with dilute aqueous sodium hydroxide and precipitated by pouring into cold dilute hydrochloric acid to yield crystalline prims, m.p. 141–144° C., consisting of equal parts of *cis*- and *trans*-isomers. A sample recrystallized from 80 percent ethanol had m.p. 144–145° C.

Analysis: Calculated for $C_{14}H_{14}O_3$ (254.27): C, 75.57; H, 5.55. Found: C, 75.69; H, 5.67.

(2) Fractional crystallization of 1-phenyl-3-isochromancarboxylic acid

The 50/50 isomeric mixture of crystalline acid, upon slow recrystallization from acetone, yields 90 percent pure *trans* isomer; plates m.p. 174–178° C. The residual oil gives, upon recrystallization from isopropyl alcohol-water, 95 percent pure *cis* isomer; needles m.p. 162–164° C.

(3) Cis/trans-3-carboxamido-1-phenylisochroman

Cis/trans - 3 - (1-phenylisochroman)carboxylic acid is treated with an excess of thionyl chloride in refluxing methylene chloride, then the solvent is evaporated to provide 3-(1-phenylisochroman)-carbonyl chloride. The residual acid chloride is dissolved in diethyl ether and cooled to 0° C., an excess of concentrated ammonium hydroxide is added slowly and the slurry is stirred at 0° C. for 15 minutes. The white precipitate is filtered and washed with water and ether, m.p. 143–205° C. Recrystallization from methanol gives colorless plates with two sharp melting points, 196–197° C. and 202–205° C., a 50/50 *cis-trans* mixture according to analysis of the nuclear magnetic resonance spectrum.

Analysis: Calculated for $C_{16}H_{15}NO_2$ (253.30): C, 75.87; H, 5.97; N, 5.53. Found: C, 75.52; H, 6.10; N, 5.98.

The 1-phenyl-3-isochromancarboxamides prepared as set forth in Examples 1 and 2 above are reduced to the corresponding 2-aminomethyl-1-(p - trifluoromethylphenyl)isochroman and 3 - aminomethyl-1-phenylisochroman be reducing the carbonyl group of the amides to the methylene group using lithium hydride in tetrahydrofuran solution.

EXAMPLE 3

*Cis-/trans*-3-cyano-1-phenylisochroman

The crude isomeric *cis/trans*-3-carboxamido-1-phenylisochroman is heated with an equimolar amount of p-toluenesulfonylchloride in pyridine for 4.5 hours at 110–120° C. Work-up by diethyl ether extraction and evaporation gives 92 percent crystalline product, sufficiently pure for further use. A sample recrystallized from a diethyl ether petroleum ether mixture gives colorless prisms, m.p. 98–104° C.

Analysis: Calculated for $C_{16}H_{13}NO$ (235.28): C, 81.68; H, 5.57; N, 5.95. Found: C, 81.45; H, 5.58; N, 5.67.

EXAMPLE 4

*Cis-/trans-* (in 4:1 ratio) 1-phenyl-3-isochromancarboxamide hydrohydrochloride Cis/trans-3-cyano-1-phenylisochroman is stirred with an equimolar amount of sodium methoxide in dry methanol for 48 hours at 25° C., a slight excess of ammonium chloride is added, the mixture is stirred an additional three hours, then the solvents are evaporated to yield the crude hydrochloridesalt. The product is washed with water and recrystallized from an ethanol chloroform mixture as colorless prisms, m.p. 256–258° C., an 80/20 *cis/trans* mixture according to analysis of the nuclear magnetic resonance spectrum.

Analysis: Calculated for $C_{16}H_{16}N_2O \cdot HCl$ (288.78): C, 66.55; H, 5.93; N, 9.70. Found: C, 66.31; H, 5.91; N, 9.66.

EXAMPLE 5

Ethyl 3-(1phenylisochroman)carboxylate

A solution of 3-(1-phenylisochroman)carboxylic acid in methylene chloride is refluxed with excess thionyl chloride. The solvent and excess thionyl chloride are removed by evaporation, then the acid chloride is dissolved in diethyl ether, a trace of sulfuric acid and excess absolute ethanol is added, and the mixture is refluxed for several hours. Evaporation to remove the solvent and excess ethanol provides the desired product.

EXAMPLE 6

3-(ethyl-formimino)-1-phenylisochroman hydrochloride

Into a solution of 3-cyano-1-phenylisochroman (500 mg., 4.25 mmole) in chloroform (5 ml.) and ethanol (1 ml.) at 0° C. is bubbled gaseous hydrogen chloride for 30 minutes. The solution is maintained at —5° C. for about 16 hours, then the solvents are removed by evaporation to yield the solid product. The structure is confirmed by its infrared spectrum and nuclear magnetic resonance spectrum.

3-aminomethyl-1-phenylisochromans have useful physiological activity on the mammalian central nervous system, e.g. as anorectic agents, as shown in copending application Ser. No. 174,992, filed Aug. 25, 1971, now U.S. Pat. 3,743,659, as a continuation-in-part of application Ser. No. 855,457, filed Aug. 25, 1969, now abandoned.

What is claimed is:

1. Process for production of a 3-aminomethyl-1-phenylisochroman which comprises converting a 1-phenyl-3-isochromancarboxylic acid to the corresponding carboxylic acid chloride or bromide, reacting the halide thus formed with ammonia, a primary or secondary amine having from 1 to 12 carbon atoms to form the corresponding carboxylic acid amide, and reducing the carbonyl group of the amide.

2. Process for production of a 3-aminomethyl-1-phenylisochroman which comprises the steps of reacting a 1-phenyl-3-isochromancarboxylic acid chloride or bromide in inert solvent solution at a temperature in the range of about 25° to 100° C. with a basic nitrogen-containing compound having the formula

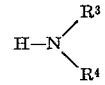

wherein $R^3$ and $R^4$ are independently hydrogen, lower alkyl or hydroxy-lower alkyl, or, when taken together with the nitrogen atom to which they are attached, form a saturated 5 or 6 membered nitrogen-containing ring having from 3 to 5 carbon atoms in the ring, one of which may be replaced by oxygen, to form the coersponding carboxylic acid amide; and reducing the carbonyl group of said amide.

3. In the process for producing a 3-aminomethyl-1-phenylisochroman, the step which comprises treating a 1-phenyl-3-isochromancarboxylic acid chloride or bromide in inert solvent solution at a temperature in the range of about 25° to 100° C. with ammonia or a primary or secondary amine having from 1 to 12 carbon atoms.

4. A compound of the formula

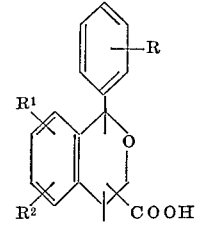

wherein R is hydrogen, lower alkyl, lower alkoxy, halogen, hydroxy, amino, N-lower alkylamino or N,N-di-lower alkylamino; and $R^1$ and $R^2$ are each hydrogen, lower alkyl, trifluoromethyl, hydroxy, lower alkoxy or halogen; and salts, esters, acid halides, acid anhydrides, acid amides, imino esters, amidines, hydroxamic acids, acid hydrazides and acid azides thereof involving the carbonyl group.

5. 1-phenyl-3-isochromancarboxylic acid according to claim 4.

6. A compound according to claim 4, wherein the derivatives involving the carbonyl group are

wherein $R^3$ and $R^4$ are independently hydrogen, lower alkyl or hydroxy-lower alkyl, or, when taken together with the nitrogen atom to which they are attached, form pyrrolidino, piperidino, morpholino, piperazino, N-lower alkylpiperazino or N-phenylpiperazino; —COOM, wherein M is metal ion; —CN; —C(NH)NH$_2$; —CONHOH; —CONHNH$_2$; —COX, wherein X is chlorine or bromine; or —COOR$^5$, wherein R$^5$ is lower alkyl.

7. A compound according to claim 4 having the formula

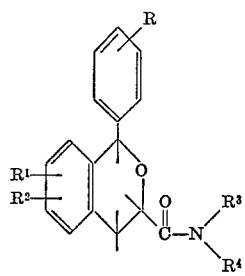

wherein R is hydrogen, lower alkyl, halogen, trifluoromethyl, amino, N-lower alkylamino or N,N'-lower dialkylamino; $R^1$ and $R^2$ are independently hydrogen, lower alkyl, trifluoromethyl, hydroxy and lower alkoxy, and $R^3$ and $R^4$ are independently hydrogen, lower alkyl or hydroxy-lower alkyl, or, when taken together with the nitrogen atom to which they are attached, form pyrrolidino, piperidino, morpholino, piperazino, N-lower alkylpiperazino or N-phenylpiperazino.

8. 1-phenyl-3-isochromancarboxamide according to claim 6.

9. 1-(p-trifluoromethylphenyl) - 3-isochromancarboxamide according to claim 6.

10. A compound according to claim 6, wherein the derivative involving the carbonyl group is —COX.

11. 1-phenyl-3-isochromancarboxylic acid chloride according to claim 6.

12. Ethyl (1-phenyl-3-isochroman)carboxylic according to claim 6.

References Cited
UNITED STATES PATENTS
3,564,015  2/1971  Christy _____ 260—345.2

JOHN M. FORD, Primary Examiner

U.S. Cl. X.R.

260—999, 326.5 CA, 268 BC, 293.58, 247.2 A